United States Patent
Jackson

(10) Patent No.: US 10,176,719 B1
(45) Date of Patent: Jan. 8, 2019

(54) SYSTEM FOR LOCATING A PARKED VEHICLE

(71) Applicant: John Jackson, North Versailles, PA (US)

(72) Inventor: John Jackson, North Versailles, PA (US)

( * ) Notice: Subject to any disclaimer, the term of this patent is extended or adjusted under 35 U.S.C. 154(b) by 0 days.

(21) Appl. No.: 15/713,641

(22) Filed: Sep. 23, 2017

(51) Int. Cl.
*G08G 1/123* (2006.01)
*B60Q 1/50* (2006.01)

(52) U.S. Cl.
CPC .............. *G08G 1/123* (2013.01); *B60Q 1/50* (2013.01)

(58) Field of Classification Search
CPC .............................. G08G 1/123; H01Q 1/3216
USPC ....................................................... 340/988
See application file for complete search history.

(56) References Cited

U.S. PATENT DOCUMENTS

| 6,529,139 | B1 * | 3/2003 | Behun ................... | A63H 30/04 340/12.5 |
| 2008/0136660 | A1 * | 6/2008 | Bailey ..................... | B60Q 1/50 340/815.45 |
| 2015/0254980 | A1 * | 9/2015 | Mainini ................ | B60Q 1/482 340/988 |

* cited by examiner

*Primary Examiner* — Qutbuddin Ghulamali
(74) *Attorney, Agent, or Firm* — The Iwashko Law Firm, PLLC; Lev Iwashko

(57) ABSTRACT

A system for locating a parked vehicle includes an elongated rod mountable on the parked vehicle and supporting a plurality of lights in an array extending along and about the elongated rod, and a portable control device adapted to be carried remote from the parked vehicle and activated to wirelessly communicate with and control the plurality of lights supported by the elongated rod.

11 Claims, 1 Drawing Sheet

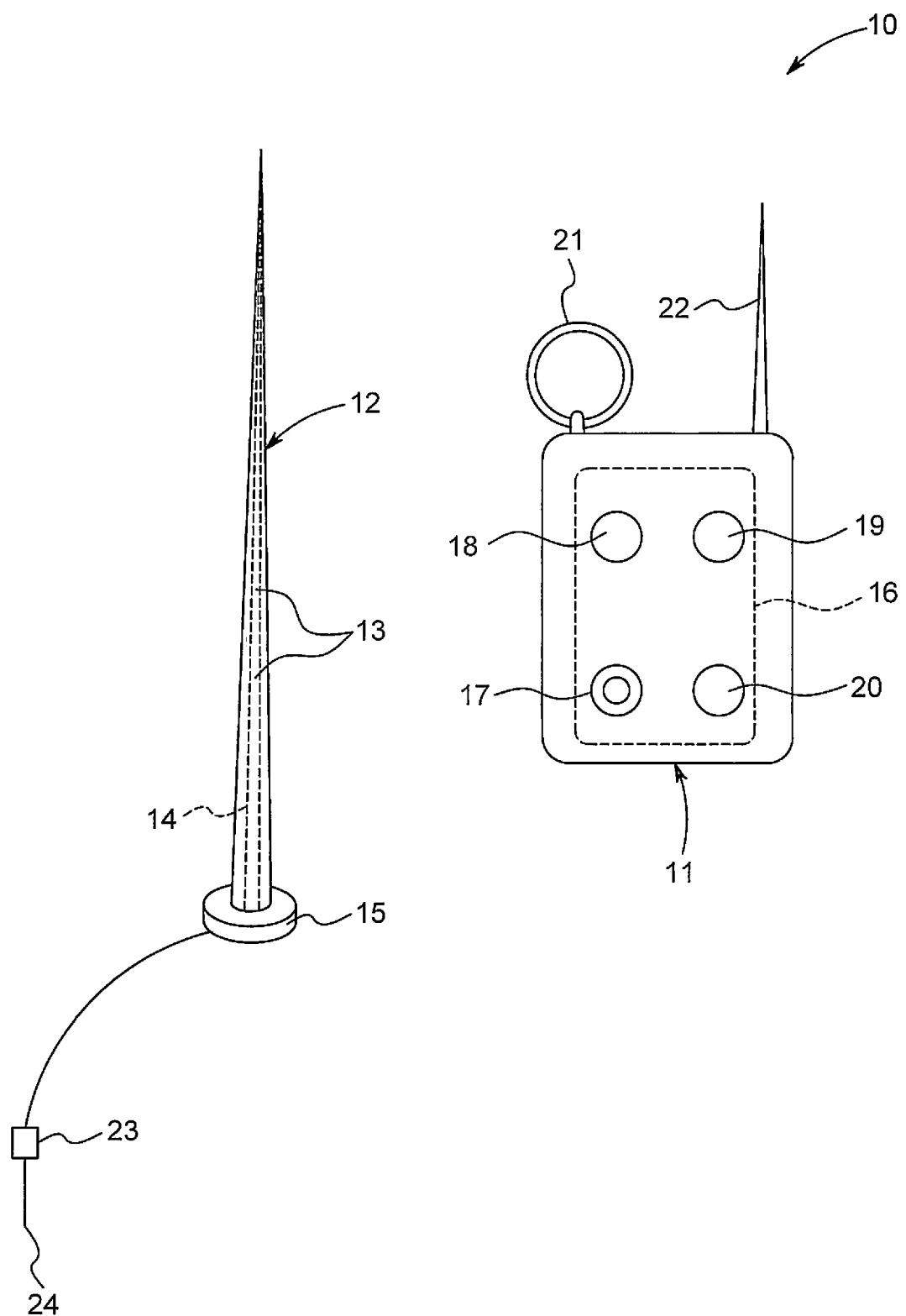

SYSTEM FOR LOCATING A PARKED VEHICLE

BACKGROUND OF THE INVENTION

1. Field of the Invention

The present general inventive concept relates generally to overcoming the wasting of time due to present inattention to matters of future importance, and, more particularly, to a system for locating a parked vehicle.

2. Description of the Related Art

When driving a car to places such as shopping plazas or malls, the driver typically parks in a large lot or garage highly populated with cars. Oftentimes, when it is time to leave a recurring problem arises. The driver and possibly other persons with the driver have forgotten where the automobile was parked. Moreover, many drivers also have a difficult time in finding their vehicles during nighttime or in poorly lit parking sites. This further complicates their search efforts and extends the time wasted by having to search.

Therefore, there is a need for a convenient way to avoid having to confront this recurring problem.

SUMMARY

The present general inventive concept provides a system for locating a parked vehicle.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a system for locating a parked vehicle. The system for locating the parked vehicle may include an elongated member mountable on the parked vehicle and supporting a plurality of lights, and a portable control device adapted to be carried remote from the parked vehicle and activated to wirelessly communicate with and control the plurality of lights supported by the elongated member.

The portable control device of the system may have a power button and may be configured to wirelessly communicate with the plurality of lights on the elongated member to either turn on or off the plurality of lights upon selectively activating the power button.

The portable control device of the system may have a power button and may be configured to wirelessly communicate with the plurality of lights on the elongated member to cause the plurality of lights to flicker upon selectively activating the power button to turn on.

The portable control device of the system may have a pattern button and may be configured to wirelessly communicate with the plurality of lights on the elongated member to manage the pattern of operation of the plurality of lights upon activating the pattern button.

The portable control device of the system may have a speed button and may be configured to wirelessly communicate with the plurality of lights on the elongated member to manage the speed of operation of the plurality of lights upon activating the speed button.

The portable control device of the system may have a color button and may be configured to wirelessly communicate with the plurality of lights on the elongated member to manage the color of the plurality of lights upon activating the color button.

The elongated member of the system may have an elongated rod and a magnet base on the elongated rod to magnetically attach the elongated rod on the vehicle.

The portable control device of the system may have a ring thereon attachable to a keychain.

The portable control device of the system may have an extended retractable antenna thereon to enable wireless communication with the plurality of lights.

The elongated member of the system has a wire harness containing electrical cables electrically connecting the plurality of lights to an electrical power source.

The plurality of lights of the system may be supported on the elongated member in an array extending along and about the elongated member.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 1 is a plan view of a system for locating a parked vehicle, according to an exemplary embodiment of the present general inventive concept.

DETAILED DESCRIPTION OF THE INVENTION

Various example embodiments (a.k.a., exemplary embodiments) will now be described more fully with reference to the accompanying drawings in which some example embodiments are illustrated. In the FIGURES, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Referring to FIG. 1 of the drawings, a system for locating a parked vehicle, according to an exemplary embodiment of the present general inventive concept, is illustrated and generally designated 10. The system 10 may include a portable control device 11 that is carried remote from the parked vehicle (not shown) by a user of the vehicle, such as a driver or passenger of the vehicle. The system 10 may also include an elongated member 12 supporting a plurality of lights 13, such as the light emitting diode (LED) type. The elongated member 12 may be in the form of an elongated rod 14 mounted on the antenna of the vehicle or having a magnetic base 15 to magnetically attach the elongated rod 14 on the vehicle. Also, the plurality of lights 13 may be supported on the elongated rod 14 in an array extending along and about the elongated rod so that the lights are visible from any angle.

The portable control device 11 and the plurality of lights 13 of the system 10 may be configured to wirelessly communicate with each other. More particularly, the portable control device 11 may include a processor 16 (including a transmitter) enabling such wireless communications, and the elongated member 12 may include a receiver connected to the plurality of lights 13 further enabling such wireless communications.

The portable control device 11 may have a power button 17 and one or more of a pattern button 18, a speed button 19 and a color button 20, with each of the buttons being electrically coupled to the processor 16 to manage different operations performed by the portable control device 11 upon activation of selected ones of the buttons. For instance, upon activation of the power button 17 the portable control device 11, as configured by its processor 16, may wirelessly communicate with the plurality of lights 13 to either turn on or off and also to cause the plurality of lights 13 to flicker when the power button 17 is turned on. Upon activation of the pattern button 18 the portable control device 11, as further configured by its processor 16, may wirelessly communicate with the plurality of lights 13 to manage the pattern of operation of the plurality of lights. Upon activation of the speed button 19 the portable control device 11, as further configured by its processor 16, may wirelessly communicate with the plurality of lights 13 to manage the speed of operation of the plurality of lights. Upon activation of the color button 20 the portable control device 11, as further configured by its processor 16, may wirelessly communicate with the plurality of lights 13 to manage the color of the plurality of lights.

Additionally, the portable control device 11 may have a ring 21 thereon that is attachable to a keychain (not shown). Also, the portable control device 11 may have an extended retractable antenna 22 connected to the transmitter of the processor 16 to enable wireless communication with the plurality of lights 13. Further, the elongated member 12 may have a wire harness 23 containing electrical cables 24 that electrically connect the plurality of lights 13 to an electrical power source (not shown), which may located on the vehicle.

The elongated member 12 may also be retractable within a body of an automobile, or may be secured to the body of the automobile using electromagnets, nails, solder, adhesives, screws, or any other method of securing. For example, if the method of securing is using electromagnets, a magnet may be placed inside the automobile on a ceiling of the automobile, and the elongated member 12 may be placed on a roof of the automobile to correspond to the electromagnet. As such, the elongated member 12 would not be able to be removed from the roof of the automobile due to a large electromagnetic force between the electromagnet and the elongated member 12. However, if the elongated member 12 were to be removed from the vehicle, the wireless communication capabilities of the system 10 would allow the elongated member 12 to be located using either the portable control device 11, or alternatively, a mobile device. In other words, because the system 10 includes the portable control device 11 in wireless communication with the elongated member 12, the elongated member 12 is trackable by the portable control device 11.

Thus, based on the foregoing detailed description, the present general inventive concept is to provide a system 10 that assists users in locating their parked vehicles in parking areas, for example, within a hundred yards perimeter from the portable control device 11. When parking in a large lot at a shopping center or mall, now users do not have to remember where they earlier parked their vehicles. Whether it is nighttime or daytime, the system 10 may be activated to show users instantly, for instance, through different light patterns, colors and speeds, where their vehicles are located, even though the system 10 naturally is more advantageous at nighttime, especially in highly populated parking lots.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A system for locating a parked vehicle, comprising:
   an elongated member removably mountable on the parked vehicle, such that the elongated member supports a plurality of lights and is different and separate from an antenna of the parked vehicle; and
   a portable control device adapted to be carried away from the parked vehicle and activated to wirelessly communicate with and control the plurality of lights supported by the elongated member, such that the portable control device locates the elongated member in response to the elongated member being removed from the parked vehicle.

2. The system of claim 1, wherein the portable control device has a power button and is configured to wirelessly communicate with the plurality of lights on the elongated member to either turn on or off the plurality of lights upon selectively activating the power button.

3. The system of claim 1, wherein the portable control device has a power button and is configured to wirelessly communicate with the plurality of lights on the elongated member to cause the plurality of lights to flicker upon selectively activating the power button to turn on.

4. The system of claim 1, wherein the portable control device has a pattern button and is configured to wirelessly communicate with the plurality of lights on the elongated member to manage the pattern of the plurality of lights upon activating the pattern button.

5. The system of claim 1, wherein the portable control device has a speed button and is configured to wirelessly communicate with the plurality of lights on the elongated member to manage the speed of operation of the plurality of lights upon activating the speed button.

6. The system of claim 1, wherein the portable control device has a color button and is configured to wirelessly communicate with the plurality of lights on the elongated member to manage the color of the plurality of lights upon activating the color button.

7. The system of claim 1, wherein the elongated member has an elongated rod and a magnet base on the elongated rod to magnetically attach the elongated rod on the vehicle.

8. The system of claim 1, wherein the portable control device has a ring thereon attachable to a keychain.

9. The system of claim 1, wherein the portable control device has an extended retractable antenna thereon to enable wireless communication with the plurality of lights.

10. The system of claim 1, wherein the elongated member has a wire harness containing electrical cables electrically connecting the plurality of lights to an electrical power source.

11. The system of claim 1, wherein the plurality of lights are supported on the elongated member in an array extending along and about the elongated member.

\* \* \* \* \*